United States Patent [19]

Atkinson et al.

[11] Patent Number: 4,591,166

[45] Date of Patent: May 27, 1986

[54] GASKET AND PROCESS OF MAKING GASKETS FROM EXFOLIATED GRAPHITE

[75] Inventors: Alan W. Atkinson, Rochdale; Katryna J. Dearden, Littleborough; Christina Doyle, Cranleigh; Janet M. Lancaster, Littleborough; Kenneth H. Marshall, Maidenhead; Kay L. Robinson, West Drayton, all of England

[73] Assignee: T & N Materials Research Limited, Manchester, England

[21] Appl. No.: 691,521

[22] Filed: Sep. 29, 1983

[30] Foreign Application Priority Data

Oct. 1, 1982 [GB] United Kingdom ................. 8228154

[51] Int. Cl.$^4$ ........................ C01B 31/04; F16J 15/12; F02F 11/00; B32B 3/12
[52] U.S. Cl. ........................ 277/1; 277/227; 277/215; 277/235 B; 277/DIG. 6; 264/112; 264/128; 423/448; 428/408
[58] Field of Search ............. 277/DIG. 6, 235 B, 213, 277/215, 227, 1; 423/448; 428/367, 368, 402, 407, 408; 264/105, 112, 113, 330, 119, 128

[56] References Cited

U.S. PATENT DOCUMENTS

| 1,068,585 | 7/1913 | Hettinger | 277/235 B X |
| 1,808,774 | 6/1931 | Hettinger | 277/235 B X |
| 4,032,274 | 6/1977 | Troy et al. | 264/128 X |
| 4,075,114 | 2/1978 | Ishikawa et al. | 423/448 X |
| 4,157,835 | 6/1979 | Kahle et al. | 277/DIG. 6 X |
| 4,223,897 | 9/1980 | Staab et al. | 277/235 B |
| 4,234,638 | 11/1980 | Yamazoe et al. | 264/112 X |
| 4,400,433 | 8/1983 | Ishiguro et al. | 428/408 |

FOREIGN PATENT DOCUMENTS

| 797144 | 10/1968 | Canada | 423/448 |
| 1056660 | 6/1979 | Canada | 277/DIG. 6 |
| 2646832 | 4/1978 | Fed. Rep. of Germany . | |
| 2306078 | 10/1976 | France | 277/235 B |
| 55-69360 | 5/1980 | Japan | 277/DIG. 6 |
| 57-179469 | 5/1982 | Japan | 277/235 B |
| 508050 | 6/1939 | United Kingdom | 277/235 B |

Primary Examiner—Robert S. Ward
Attorney, Agent, or Firm—Nixon & Vanderhye

[57] ABSTRACT

Graphite gaskets with an improved release characteristic are embossed to form a relief pattern of relatively raised areas surrounded by predominantly interconnected depressions, followed by coating with a silicone rubber.

13 Claims, No Drawings

GASKET AND PROCESS OF MAKING GASKETS FROM EXFOLIATED GRAPHITE

TECHNICAL FIELD OF THE INVENTION

This invention relates to gaskets exhibiting improved release characteristics after use in a joint between mating parts. In particular it relates to gaskets made from flakes of expanded graphite.

Gaskets and in particular cylinder head gaskets, should ideally be readily removable on dismantling the joints in which they have been used, even after long service. However, many gasket materials and especially graphite tend to adhere very firmly to the mating faces of a joint. Graphite gaskets, for example both adhere very firmly and tend to de-laminate easily after use, leaving large amounts of graphite adhered to one or both faces of the joint. Before the joint can be made good again, with a new gasket, the mating faces have to be cleaned by scraping off the adherent material, with the attendant risk of dislodged material entering passageways through the component parts of the joint, such as oil and/or waterways. Scraping may also cause mechanical damage to the joint faces.

THE PRIOR ART

Adhesion of gasket materials is an old problem. Various solutions have been proposed, including the use of release agents such as mica, aluminium powder, talc, soaps, soapstone, ptfe, silicone rubbers and varnishes. Apart from the ephemeral nature of powder treatments and the easily-abraded character of silicone rubber layers on graphite, there are also the effects of temperature, pressure and time to consider. Considerable temperature variations exist in a cylinder head assembly for example. In the case of graphite, none of the known release treatments is particularly effective, especially for cylinder head gaskets.

BRIEF DESCRIPTION OF THE INVENTION

According to the present invention a method of making a graphite gasket includes the steps of embossing (as defined below) and then coating with a silicone rubber. The silicone rubber is preferably applied in the form of a curable composition which is cured in situ on the gasket, either by heat or in the case of a "room temperature vulcanising" material, by allowing it to cure at ambient temperature.

PREFERRED FEATURES OF THE INVENTION

The embossing step is preferably associated with a pressing step; this latter step may be combined with the embossing step, or it may be a separate step carried out prior to embossing. Embossing in this present context means the formation of a relief pattern on at least one surface of the gasket, the pattern comprising raised areas or islands surrounded by predominantly interconnected, depressed regions. Both embossing and pressing may be accomplished by various means, for example by the use of press platens, with or without an engraved pattern, as appropriate. Calendering rolls, with or without engraving may also be used. Pressing/rolling the gasket against a woven monofilament cloth or expanded metal mesh can also be used to form the desired relief pattern.

While the preliminary pressing step (if required) is preferably used to reduce the void content of a relatively low density gasket preform, it will be appreciated that it may also constitute the manufacturing process for the preform/gasket. In other words, the preform/gasket may be produced directly from expanded graphite flakes and such a process is within the ambit of this present specification.

One form of embossing of gasket material is known from German patent publication OLS No. 2646832. However, that document is concerned with forming relatively soft interconnected raised portions and hard isolated depressed regions over the face of a gasket in order to provide sealing regions and stress-resisting regions, respectively. This particular embossing treatment for graphite cylinder head gaskets has been found to be ineffective as regards release performance after service.

It has been found that the combination of embossing and then treating with a silicone rubber gives very much better results in a cylinder head gasket than does any of the prior proposals.

DESCRIPTION OF A PREFERRED EMBODIMENT

In order that the invention be better understood a preferred embodiment of it will now be described with reference to the following example.

EXAMPLE

Exfoliated (expanded) graphite flakes of density 4 kg/m$^3$ were lightly pressed to give a shear preform of density 30 kg/m$^3$ at a thickness of 20 mm. The preform was repeatedly passed through cold calender rolls (at room temperature) the calender nip being progressively reduced in 1.5 mm steps to develop a final graphite density of 1500 kg/m$^3$ at a thickness of 0.4 mm. Six to ten passes of the calender were needed for this. The sheet product was then covered on each face with a piece of woven polyester monofilament bolting cloth (0.15 mm monofilaments 0.4 mm apart) and passed through a roller nip. Platen pressing at 7 MPa (1000 psig) was equally effective to emboss into the graphite surface the weave pattern, forming a network of interconnected depressed regions.

The embossed sheet was then treated on both sides with a proprietary silicone rubber ("SYLOFF" 7044) applied by brush. Pad, roller and spray application were equally effective. The level of application was 8–10 g/m$^2$.

The rubber was cured by heating for 15 minutes at 150° C.

Test Procedures

The product was robust and as a result of the embossing, showed little tendency for the silicone rubber finish to be abraded on handling. It was tested first of all in a laboratory test rig comprising two thick discs of cast iron and aluminium, respectively, clamped together by means of a nut and bolt. The mating faces were machined to a finish of 50 um and were thinly coated with ordinary engine oil prior to use. A sample of the treated graphite sheet was clamped between the discs at 1500 psig ($1.055 \times 10^{-2}$ kg/m$^2$.) The rig was placed into an oven and held at a test temperature of 150° C. After 25 hours, it was removed from the oven and allowed to cool naturally before unbolting the assembly and separating the discs to see how much (if any) graphite had adhered to each of them. Untreated graphite adheres totally and completely delaminates in this test. Graphite treated according to the invention released cleanly and easily. This was confirmed in a further test conducted at 550° C.

A further sample was subjected to a trial in a car engine; the graphite was used as a cylinder head gasket.

The engine was run for 25 hours under a load/speed cycle simulating arduous driving conditions. On dismantling the engine, the graphite gasket according to the invention was removed without difficulty, there was no delamination and no graphite debris was left on the faces of the joint. The cylinder head was much easier to remove than it would have been using either untreated graphite or other more conventional non-graphite materials.

We claim:
1. A method of making a gasket from exfoliated graphite, by a process including the steps of
   (a) embossing the gasket to form a relief pattern comprising raised areas surrounded by predominantly interconnected depressed regions, and thereafter
   (b) coating the thus embossed gasket with a silicone rubber.
2. The method of claim 1 wherein the embossing step is preceded by a pressing step.
3. The method of claim 1 wherein the process is carried out at ambient temperature.
4. The method of claim 2 wherein the pressing step is applied to the graphite in the form of a relatively low density preform whereby the void content of the graphite is reduced.
5. The method of claim 1 wherein the embossing step is carried out by pressing the graphite against a woven fabric or expanded metal mesh.
6. The method of claim 1 wherein the embossing step is carried out by pressing the graphite against a woven monofilament cloth.
7. The method of claim 1 wherein the embossing step is carried out by means of embossing rollers.
8. The method of claim 1 wherein the embossing step is carried out by means of press platens.
9. The method of claim 1 including the further step of (c) curing the silicone rubber in situ on the gasket.
10. A graphite gasket made by the method of claim 1.
11. The method of claim 1 wherein step (a) includes pressing.
12. The method of claim 1 wherein the embossing step is carried out by calendering the graphite against a woven fabric or expanded metal finish.
13. The method of claim 1 wherein the embossing step is carried out by calendering the graphite against a woven monofilament cloth.

* * * * *